G. LAMBERT.
HAY-RAKE AND LOADER.
No. 172,455. Patented Jan. 18, 1876.
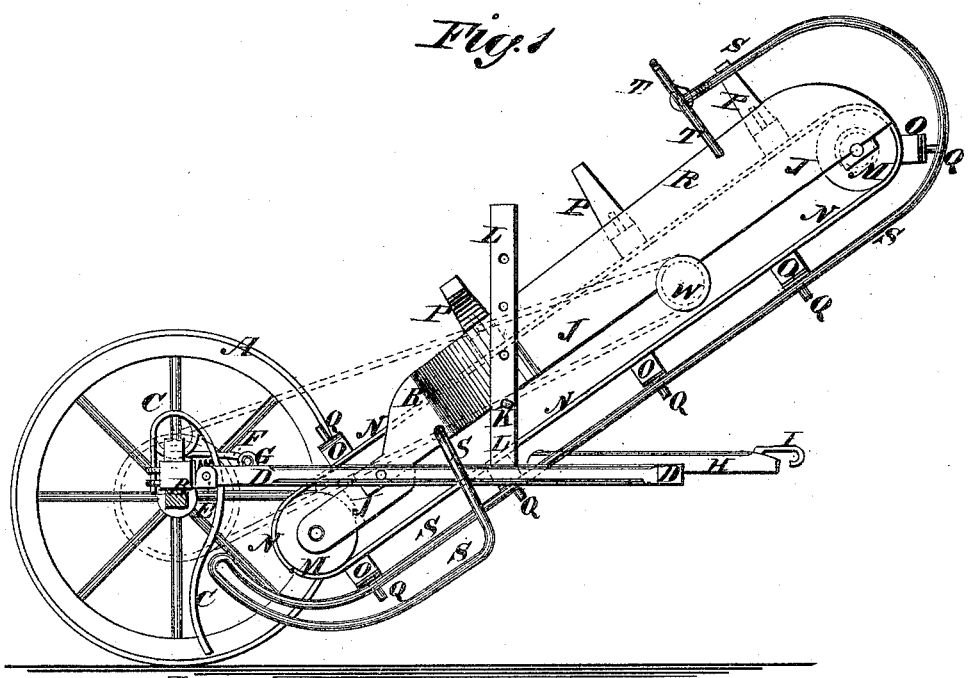
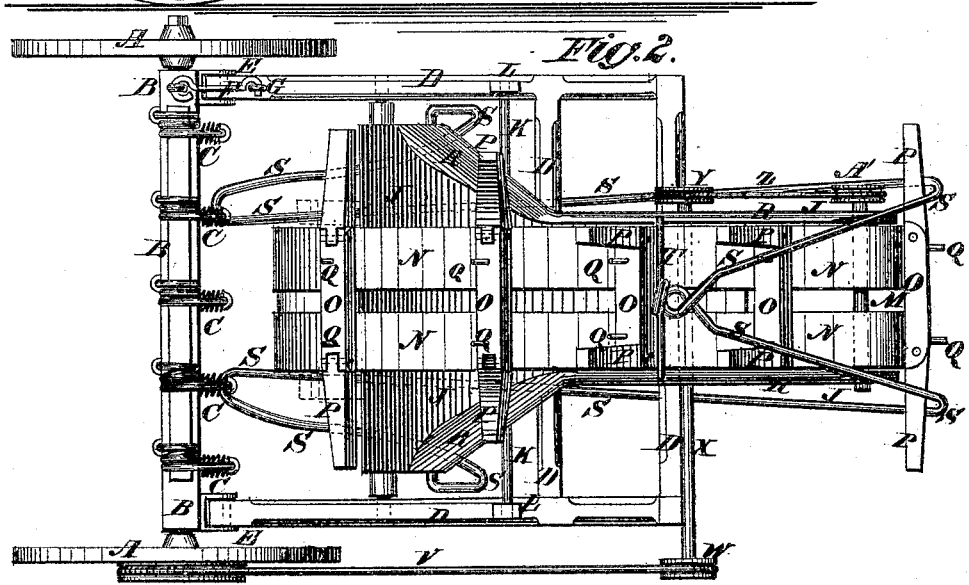
WITNESSES:
INVENTOR:
George Lambert
BY
ATTORNEYS.

UNITED STATES PATENT OFFICE.

GEORGE LAMBERT, OF HILL GROVE, OHIO.

IMPROVEMENT IN HAY RAKERS AND LOADERS.

Specification forming part of Letters Patent No. 172,455, dated January 18, 1876; application filed September 25, 1875.

*To all whom it may concern:*

Be it known that I, GEORGE LAMBERT, of Hill Grove, in the county of Darke and State of Ohio, have invented a new and useful Improvement in Hay-Loader, of which the following is a specification:

Figure 1 is a side view of my improved machine, one of the wheels being removed. Fig. 2 is a top view of the same.

Similar letters of reference indicate corresponding parts.

The object of this invention is to furnish an improved machine for gathering hay and loading it upon a wagon, and which shall be simple in construction, convenient in use, and effective and reliable in operation.

The invention consists in the combination of the hinged arms with the cross-bars attached to the endless apron of the carrier; in the combination of the guides and the bow with the frame and the hinged arms of the endless carrier.

A are the wheels, which revolve upon the journals of the axle B. To the axle B are attached the spring wire teeth C, by which the hay is collected. D is a frame, the rear ends of the side bars of which are hinged to the forward side of the axle B by the coupling E, so that the said axle may be turned forward over the rear end of the frame D to raise the teeth C away from the ground, for convenience in passing from place to place. The axle B is secured in place to hold the teeth C in working position by a hook or hooks, F, pivoted to the said axle B and hooking into eyes G attached to the side bar or bars of the frame D. To the middle part of the cross-bars of the frame D is attached a bar, H, which projects forward and has a hook, I, attached to its forward end to be hooked into an eyebolt or staple attached to the rear part of the wagon upon which the hay is to be loaded. J is the carrier-frame, which is pivoted near its rear end to the side bars of the frame D, and which is supported at any desired inclination by a rod, K, upon which it rests, and which passes through holes in the uprights L, attached to the side bars of the frame D. Several holes are formed in the uprights L to receive the rod K, to enable the inclination of the carrier-frame J to be adjusted as circumstances may require. To the upper and lower ends of the carrier-frame D are pivoted rollers or pulleys M, around which passes an endless apron, N, to which are attached, at suitable distances apart, cross-bars O, to the ends of which are hinged arms P. To the cross-bars O and arms P are attached spikes, prongs, or hooks, Q, to take hold of the hay as it is collected by the teeth C, and carry it up the carrier. R are guides attached to the sides of the carrier J, and the lower parts of which are made flaring, the said guides being so formed as to raise the arms P as they pass up the carrier-frame from a horizontal to a vertical position, and hold them in said vertical position until they reach the upper end of the carrier-frame J.

By this construction the arms P press the hay inward, so that it may be delivered upon the wagon in a compact form. The upper ends of the guides R are flared so as to allow the arms P to be forced out into a horizontal position as they pass around the upper end of the carrier. S are guides, the upper ends of which are attached to the middle part of a bow, T, that passes over the upper part of the carrier transversely, and the ends of which are secured to the sides of the carrier-frame. From the bow T, the guides S incline outward and curve downward so as to force the hinged arms P from a vertical into a horizontal position as they pass around the upper end of the carrier, thus releasing the hay and allowing it to fall upon the wagon. The guides S pass down parallel with the bottom of the carrier, so as to support the arms P in a horizontal position as they pass down. At the lower end of the carrier the guides S are curved upward to support the arms P, until they have passed to the upper side of the said carrier. The guides are then curved downward and backward, and their ends are secured to the sides of the carrier-frame J. To one of the wheels A is attached a pulley, U, around which passes a band, V. The band V also passes around the pulley W, attached to the end of the shaft X, which revolves in bearings attached to the carrier-frame J, and to the other end of which is attached another pulley, Y. Around the pulley Y passes a band, Z, which also passes around a pulley, A, attached to the journal of the upper roller or pulleys M, so that the carrier may be driven by the advance of the machine.

Having thus described my invention, I claim as new and desire to secure by Letters Patent—

1. In a hay-loader the combination of the hinged arms P, and means for raising the same from a horizontal to a vertical position with the endless apron N and cross-bars O, substantially as and for the purpose herein set forth.

2. The combination of the guides R and S and the bow T, with the frame J, and the hinged arms P of the endless carrier, substantially as herein shown and described.

GEORGE LAMBERT.

Witnesses:
J. A. BICKEL,
A. D. STUDEBAKER.